United States Patent [19]
Buhrke et al.

[11] Patent Number: 5,806,029
[45] Date of Patent: Sep. 8, 1998

[54] SIGNAL CONDITIONED MINIMUM ERROR RATE TRAINING FOR CONTINUOUS SPEECH RECOGNITION

[75] Inventors: Eric Rolfe Buhrke, Clarendon Hills, Ill.; Wu Chou, Berkeley Heights; Mazin G. Rahim, Manalapan, both of N.J.

[73] Assignee: AT&T Corp, Middletown, N.J.

[21] Appl. No.: 528,821

[22] Filed: Sep. 15, 1995

[51] Int. Cl.⁶ .................................................. G10L 5/00
[52] U.S. Cl. ........................................ 704/244; 704/245
[58] Field of Search ............................... 395/2.09, 2.35, 395/2.36, 2.42, 2.52, 2.54; 704/200, 226, 227, 233, 243–245

[56] References Cited

U.S. PATENT DOCUMENTS

| | | | |
|---|---|---|---|
| 4,348,553 | 9/1982 | Baker et al. | 395/2.5 |
| 4,718,093 | 1/1988 | Brown | 395/2.52 |
| 4,783,804 | 11/1988 | Juang et al. | 395/2.54 |
| 4,926,488 | 5/1990 | Nadas et al. | 395/2.42 |
| 5,125,022 | 6/1992 | Hunt et al. | 379/88 |
| 5,127,043 | 6/1992 | Hunt et al. | 379/88 |
| 5,148,489 | 9/1992 | Brell et al. | 395/2.35 |
| 5,222,146 | 6/1993 | Bahl et al. | 395/2.42 |
| 5,297,194 | 3/1994 | Hunt et al. | 379/88 |
| 5,303,299 | 4/1994 | Hunt et al. | 379/88 |
| 5,349,645 | 9/1994 | Zhao | 395/2.52 |
| 5,579,436 | 11/1996 | Chou et al. | 395/2.53 |
| 5,590,242 | 12/1996 | Juang et al. | 395/2.54 |

OTHER PUBLICATIONS

Rahim and Juang, "Signal Bias Removal for Robust Telephone Based Speech Recognition in Adverse Environments," Proceeding ICASSP '94, vol. II, 1994, pp.I–445 through I–448.

Rahim, Juang, Chou and Buhrke, "Signal Conditioning Techniques for Robust Speech Recognition," IEEE Signal Processing Letters, vol. 3, No. 4, Apr. 1996, pp. 107–109.

Furui, "Unsupervised Speaker Adaptation Method Based on Hierarchical Spectral Clustering," IEEE 1989, pp. 286–289.

Furui, "Unsupervised Speaker Adaptation Based on Hierarchical Spectral Clustering," IEEE Trans on ASSP., vol. 37, No. 12, Dec. 1989, pp. 1923–1930.

*Primary Examiner*—David D. Knepper
*Attorney, Agent, or Firm*—Thomas A. Restaino

[57] ABSTRACT

Hierarchical signal bias removal (HSBR) signal conditioning uses a codebook constructed from the set of recognition models and is updated as the recognition models are modified during recognition model training. As a result, HSBR signal conditioning and recognition model training are based on the same set of recognition model parameters, which provides significant reduction in recognition error rate for the speech recognition system.

7 Claims, 3 Drawing Sheets

SIGNAL CONDITIONED MINIMUM ERROR RATE TRAINING FOR CONTINUOUS SPEECH RECOGNITION

FIELD OF THE INVENTION

This invention relates generally to continuous speech recognition, and more particularly to signal conditioning and recognizer training in a speech recognition system.

BACKGROUND OF THE INVENTION

The recognition of spoken digit strings is an important commercial attribute for speech recognition services in a telephone network. Applications of connected digit recognition include credit card and account number validation, catalog ordering, and spoken digit dialing by voice. The digits ("0"–"9", and "oh") provide a useful valid kernel vocabulary for both telephone and non-telephone based applications, and are an important vocabulary for speech recognition.

A speech signal (such as a digit string signal) transmitted through a telephone channel often encounters unknown variable conditions which significantly degrade the performance of hidden Markov model ("HMM")-based speech recognition systems. Undesirable components are added to the communicative portion of the signal due to ambient noise and channel interference, as well as from different sound pick-up equipment and articulatory effects. The presence of these "contaminant" signal components renders many speech recognition systems heretofore unsuitable for many real-world applications.

Noise is considered to be additive to a speech signal. The spectrum of a real noise signal, such as that produced from fans and motors, is generally not flat and can degrade speech recognition system performance. Channel interference, which can be linear or non-linear, can also degrade speech recognition performance.

A typical conventional telephone channel effectively band-pass filters a transmitted signal between 200 Hz and 3200 Hz, with variable attenuations across the different spectral bands. This filtering effect should be made consistent when training and operating a speech recognition system. The use of different microphone transducers, in different environmental conditions, for different speakers can create an acoustic mismatch between recognition models and encountered speech signals.

U.S. patent application Ser. No. 08/217,035, filed Mar. 24, 1994, entitled "SIGNAL BIAS REMOVAL FOR ROBUST TELEPHONE SPEECH RECOGNITION", now U.S. Pat. No. 5,590,242 issued Dec. 31, 1996, assigned to the owner of the present application, describes reducing the effect of acoustic and channel variations by applying signal conditioning. In that signal bias removal process, feature analysis is performed on a training speech signal to compute an estimate of the bias. The estimate of the bias is then subtracted from the training speech signal to arrive at a tentative speech signal value.

Computing the estimate of the bias and subtracting the estimate from the training string signal are repeated a predetermined number of times. Each iteration uses the previous tentative speech signal value to compute the next bias estimate to arrive at a reduced bias speech signal value.

The reduced bias speech signal value is then used as the training input to the speech recognizer, but is not integrated with training of the speech recognizer other than as described.

That signal bias removal process utilizes a codebook which is generated from the training string signals to compute the estimate of the bias for each of the training string signals. A shortcoming of that previous signal bias removal approach to training is assuming that acoustic mismatch is constant over time. In each signal bias removal iteration, a single time-constant bias is calculated for application to each frame of the training string signal.

Providing acoustically diverse training string signals is one way to improve the robustness of the recognition models to account for acoustic and channel variations encountered in operation. The diversified acoustic conditions existing in the recognition models created from acoustically diverse training signals make detailed acoustic modeling difficult.

A string-model-based minimum classification error training system is the subject of U.S. application Ser. No. 08/030,895, filed Mar. 15, 1993, entitled "RECOGNITION UNIT MODEL TRAINING BASED ON COMPETING WORD AND WORD STRING MODELS", now U.S. Pat. No. 5,579,436 issued Nov. 26, 1996, which is assigned to the owner of the present application. Such string-based minimum string classification error (MSCE) training approach is based on the principle of string error rate minimization.

In string model based minimum error rate training for a hidden Markov model (HMM)-based speech recognizer, discriminative training is based on global string model matching to account for string level acoustic manifestations. This approach has been extended to training interword context dependent acoustic models in continuous speech recognition.

The MSCE training objective is to minimize the string recognition error rate and is achieved by calculating a misrecognition measure indicating the likelihood that a recognizer having a given training will commit a recognition error based on its present state of training. In MSCE training, the misrecognition measure reflects the difference between (i) a recognizer score for a known training utterance based on the correct recognition model for the known training utterance, and (ii) an average of one or more recognizer scores for the known training utterance based on one or more other confusably-similar recognition models.

Minimum error rate training finds the classifier parameter set, denoted by $\Lambda$, and the accompanying decision rule, based on the given data set $\Omega$, such that the probability of misclassifying the input training sample X is minimized. Designing the optimal recognition classifier involves finding the right parameter set for the discriminant functions to minimize the "sample risk" defined as the average cost incurred in classifying the set of design samples $\Omega$.

MSCE training of the classifier (recognizer) finds the best HMM parameter set for the discriminant function to minimize the error, which is defined as the likelihood that the trained recognizer will misrecognize (misclassify) the set of speech string samples in the known training set, string level acoustic variations are accommodated in the MSCE approach by modeling the basic speech recognition models at the whole-utterance level. The statistical model of each basic recognition speech unit is obtained through discriminative analysis.

The mathematical formulation of string-based minimum string classification error training is described and defined below:

(1) The discriminant function for minimizing the recognition error in MSCE training is defined as:

$$g(O,S_k,\Lambda)=\log f(O,\Theta_{s_k},S_k|\Lambda), \tag{1}$$

where $S_k$ is the k-th best confusably-similar string, $\Lambda$ is the HMM parameter set used in the N-best decoding, $\Theta_k$ is the optimal path (state sequence) of the k-th string given the model set $\Lambda$, and log $f(O,\Theta_{sk}, S_k|\Lambda)$ is the related log-likelihood score on the optimal path of the k-th string.

For the lexical string $S_{lex}$ from the training set, the discriminant function is given by $$g(O,S_{lex},\Lambda)=\log f(O,\Theta_{slex},S_k|\Lambda), \quad (2)$$

where $\Theta_{lex}$ is the optimal alignment path and log $f(O,\Theta_{slex}, S_{lex}|\Lambda)$ is the corresponding log-likelihood score.

(2) A misclassification measure used in the minimum string error rate training is defined as $$d(O, \Lambda) = -g(O, S_{lex}, \Lambda) + \log \left\{ (1/N-1) \sum_{S_k \neq S_{lex}} e^{g(O,Sk,\Lambda)\eta} \right\}^{1/\eta} \quad (3)$$

The misclassification measure provides an acoustic confusability measure between the correct string model and the "N" best competing string models.

(3) A loss function to be minimized in the minimum string error rate training process is defined as:

$$1(O,\Lambda)=1/(1+e^{\gamma d(O,\Lambda)}) \quad (4)$$

where $\gamma$ is a positive constant, which controls the slope of the sigmoid function.

(4) The HMM recognition model parameters are updated sequentially according to a gradient recursion technique such that $$\Lambda_{n+1}=\Lambda_n-\epsilon_n U_n \nabla l(O,\Lambda), \quad (5)$$

where $\epsilon_n$ is a sequence of step size parameters, and $U_n$ is a sequence of positive definite matrices.

Prior continuous speech recognition work has attempted to improve the breadth of string coverage during the training process so that each recognition model can be properly trained for recognizing unknown speech strings. However, the string coverage provided by the training string material is generally very narrow when compared to the possible number of word or digit strings which can be generated in testing operations from even a limited valid vocabulary.

Training speech strings are often generated from speech data collected using a very restrictive grammar. The perplexity of the training speech strings is correspondingly low.

Spoken utterances encountered in testing may have a much higher perplexity than the training string data, and in some testing applications only a weak grammar constraint is allowed. The acoustic mismatch between training speech signals for making recognition models and encountered testing speech signals can often degrade speech recognition performance.

MSCE training incorporates N-best competing string models in the training process. The N-best string models are generated with a very loose constraint or without any grammar constraint. In this way, the competing string models are acoustically driven. Including acoustically confusable strings in training improves the string coverage provided by the trained recognition models.

Incorporating interword context dependency is important in speech recognition where coarticulation in continuous speech can be explicitly modeled. However, with interword context dependent model units, context dependency is propagated across word junctions and becomes a global string level constraint. This structure makes it difficult to identify N-best string models in training, because context dependency must be exactly maintained at the global string level during the entire search process. This is even more problematic for an N-best decoding scheme using a bidirectional search where the backward search should maintain the context dependency used in the forward search in order to achieve search consistency.

The N-best search for inter-word context-dependent model units is set according to a tree-trellis based search scheme where the search consistency is maintained even for short acoustic events, such as one-phone words. Compared to models whose context dependencies are limited to within the word and lexical entry boundaries, the string level constraint imposed by interword context dependent model units is more consistent with the criterion of string model based minimum error rate training.

Although minimum error rate training is effective in reducing the recognition error rate in adverse conditions, the error rate and the performance of the recognizer are unavoidably conditioned upon acoustic and channel variations. Signal conditioning, including signal bias removal, reduces signal variations caused by non-communicative acoustic artifacts making the acoustic space represented in recognition models and in encountered training and testing signals more homogeneous. The task of connected digit recognition continues to challenge developments in the fields of signal conditioning and speech recognition model training.

SUMMARY OF THE INVENTION

An advance in the art of signal conditioning and speech recognition model training is achieved by an illustrative embodiment of the present invention, which integrates signal conditioning and string-based minimum classification error training to create a new signal conditioned minimum error rate training process. The preferred signal conditioning technique is based on a hierarchical approach to signal bias removal.

A hierarchical signal bias removal ("HSBR") procedure is combined with a string-based minimum string classification error ("MSCE") training process in a speech recognition system. HSBR signal conditioning is functionally integrated with MSCE training in the speech recognition system. Each training string signal is HSBR signal conditioned prior to being used in recognition model training.

The HSBR signal conditioning process is derived from the mean vectors of the set of HMM parameter distributions stored as recognition models. A codebook is constructed from the recognition models and is used for signal conditioning the training string signals. The codebook represents the acoustic space corresponding to the matched channel condition and is characterized by a set of Gaussian distributions centered at one or more clusters in the codebook. The clusters are generated by clustering the acoustic cepstral feature vectors of the sets of HMM parameter Gaussian distributions stored as speech recognition models. The codebook is updated as the recognition models are modified during the process of MSCE training.

Accordingly, signal conditioning becomes a function of the HMM parameters used in speech recognition. The HSBR signal conditioning process and the minimum classification error (MSCE) training process are based on the same set of recognition HMMs.

Channel distortion is modeled in the cepstral domain by an additive bias term b. The estimated bias, b, is used to compensate for channel distortion to achieve an acoustically matched condition between the stored recognition models and encountered testing string signals.

Hierarchical signal bias removal (HSBR) includes a hierarchical clustering method in which the size of the codebook is dynamically expanded for improved signal bias compensation. HSBR signal conditioning is performed iteratively to generate multiple frame-dependent (time-varying) corrective biases for application to a speech string signal.

Acoustic modeling according to the present invention is based on a set of detailed interword context-dependent recognition models. These models are driven by the joint acoustic events at the word junctions and do not need a separate linguistic based lexicon describing the phonetic pronunciation of words in the vocabulary.

Signal conditioned minimum error rate training according to the present invention improves speech recognition performance, and makes connected digit recognition less susceptible to adverse ambient acoustic conditions. Functionally integrating signal conditioning and minimum classification error training significantly reduces recognition error rate.

BRIEF DESCRIPTION OF THE DRAWING FIGURES

FIG. 1 presents a schematic view for describing channel distortion and noise in a speech signal;

FIG. 2 presents a schematic view for describing a speech recognition system according to an embodiment of the present invention;

FIG. 3 presents a schematic view for describing a feature extractor of the speech recognition system depicted in FIG. 2;

FIG. 4 presents a schematic view for describing a signal conditioning unit and codebook of the speech recognition system depicted in FIG. 2;

FIG. 5 presents a process flow diagram for describing signal conditioning according to an embodiment of the present invention;

FIG. 6 presents a schematic view for describing signal conditioning and recognition model training in a speech recognition system according to an embodiment of the present invention; and FIG. 7 presents a process flow diagram for describing integrated signal conditioning and recognition model training according to an embodiment of the present invention.

DETAILED DESCRIPTION

Figure 1:
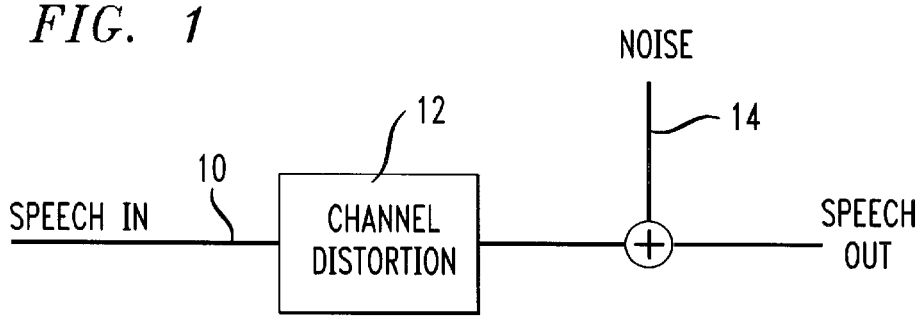

Acoustic channel mismatch between acoustic training conditions and encountered testing conditions can cause degradation in speech recognition system capabilities. Variations in telephone handsets, ambient noises, and channel distortions often add undesirable signal components contributing to acoustic mismatch in telephone based speech recognition tasks. In a conventional telephone network, a telephone speech signal 10 encounters a distortion effect due to distortion 12 in the telephone channel, and an additive ambient noise component 14, as shown in FIG. 1.

An illustrative embodiment of the present invention provides a signal conditioning technique for signal bias removal to prevent acoustic channel mismatch. The signal conditioning technique uses an equalization process to reduce acoustic mismatch between stored recognition models and operational testing conditions in a speech recognition system.

Figure 2:
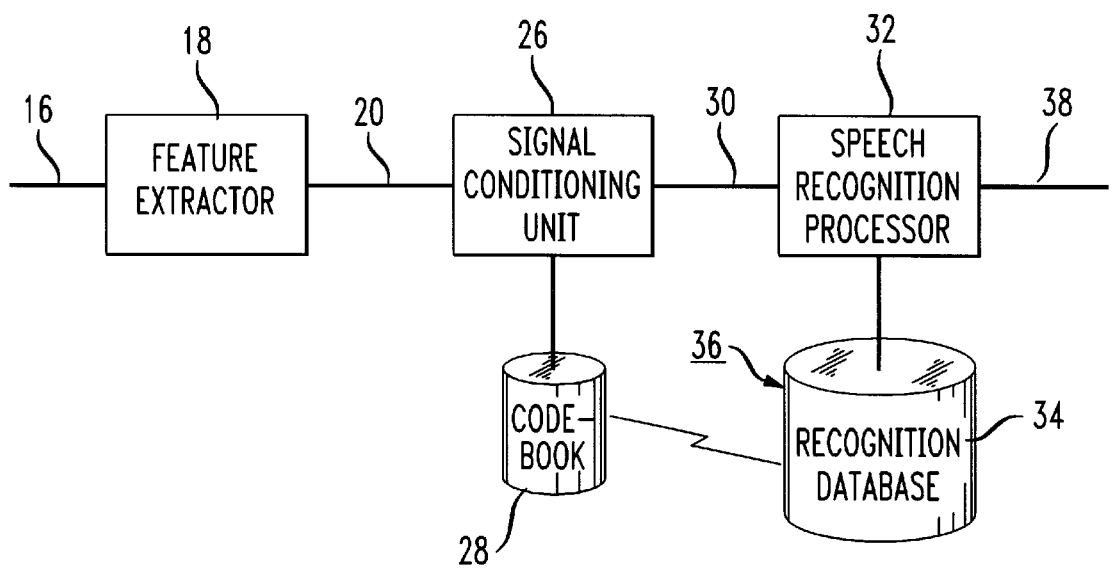

Referring to FIG. 2, a distorted speech string signal 16 (such as from a telephone channel) is input to a feature extractor 18. The feature extractor 18 performs a sequence of feature measurements to generate a feature signal 20. The feature extractor 18 extracts features and parameters of the speech string signal 16, which characterize the acoustic utterance.

Figure 3:
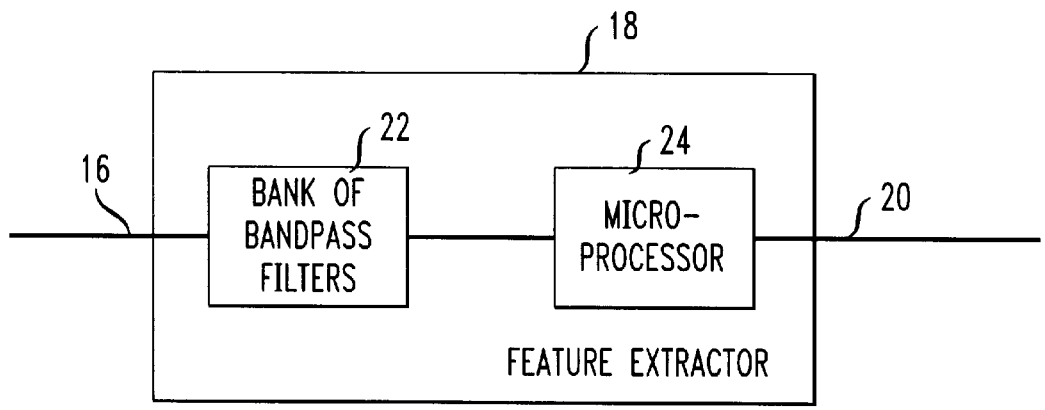

The feature measurements are based on spectral analysis techniques, such as filter bank analysis or a linear predictive coding (LPC) analysis. In the feature extractor 18, a bank 22 of bandpass filters is used to screen the speech signal, and a microprocessor 24 is used to process the filtered signals every 20 ms, as shown in FIG. 3. Feature extraction produces a series of frames of feature vectors that are characteristic of the time-varying spectral characteristics of the speech string signal 16.

The feature signal 20 generated by the feature extractor 18 is presented to a signal conditioning unit 26. The signal conditioning unit 26 is communicatively coupled to a codebook 28, which is utilized for signal conditioning the series of frames of feature vectors embodied in the feature signal 20. The signal conditioning unit 26 computes an estimate of the bias in the speech signal 16, which is representative of the potential for acoustic mismatch. The signal conditioning unit 26 removes the estimated bias to generate a conditioned feature signal 30 for input to a speech recognition processor 32.

The recognition processor 32 receives the conditioned feature signal 30 as input. The recognition processor scores (matches) the conditioned feature signal 30 against a set of HMM-based recognition models 34 stored in a recognition database 36. One or more models that best match the conditioned feature signal 30 are determined to represent the input speech string signal 16. The recognition processor 32 generates a recognized speech signal 38 representing a text form of the speech string signal 16.

The signal conditioning unit 26 can apply both spectral analysis and cepstral analysis. Cepstral coefficients are the coefficients of a Fourier transform representation of the log magnitude spectrum, and provide a reliable feature set for speech recognition. The applied signal conditioning technique incorporates a hierarchical clustering method for representing the recognition HMM parameter distributions stored as recognition models 34 in a condensed form to be used in signal bias removal.

The HMM parameter distributions 34 are condensed and stored in the codebook 28, to represent the acoustic space of the HMM parameter distributions. The size of the codebook 28, and hence the complexity of the condensed approximations of the HMM parameter distributions 34, can be dynamically and methodically expanded to controllably compensate signal bias and make speech recognition model training and operational testing more accurate.

The conditioned feature signal 30 represents the input speech string signal without signal bias. The recognition processor 32 performs hidden Markov model ("HMM")-based speech recognition. Because the conditioned feature signal 30 presented to the recognition processor 32 contains a reduced amount of noise and distortion, the recognized speech signal output 38 is more accurate.

The signal conditioning unit 26 is integrated with the speech recognition processor 32. Signal conditioning is carried out following feature extraction and preceding HMM-based speech recognition processing. In the preferred embodiment of the present invention, signal conditioning is functionally integrated with modification and adjustment of recognition database models 34 during training.

Channel distortion is modeled in the cepstral domain by an additive bias term b. The additive bias term b represents an acoustic contaminant which can cause an acoustic mismatch between training and testing string signals related to the acoustic environment. Such contaminant(s), causing an acoustic mismatch between modeled training data and testing signals, is also referred to as an "acoustic artifact".

The acoustic space corresponding to the matched channel condition is represented in condensed form in the codebook 28. The acoustic space is characterized by a set of Gaussian distributions, which are clustered at nodes in the codebook according to similar acoustic characteristics. The nodal clusters in the codebook are codewords generated by vector quantization ("VQ") clustering of the acoustic cepstral feature vectors of the recognition models 34. The VQ centroid clusters can be denoted by $\{\mu_i\}$ and can be computed using a generalized Lloyd technique.

Figure 4:
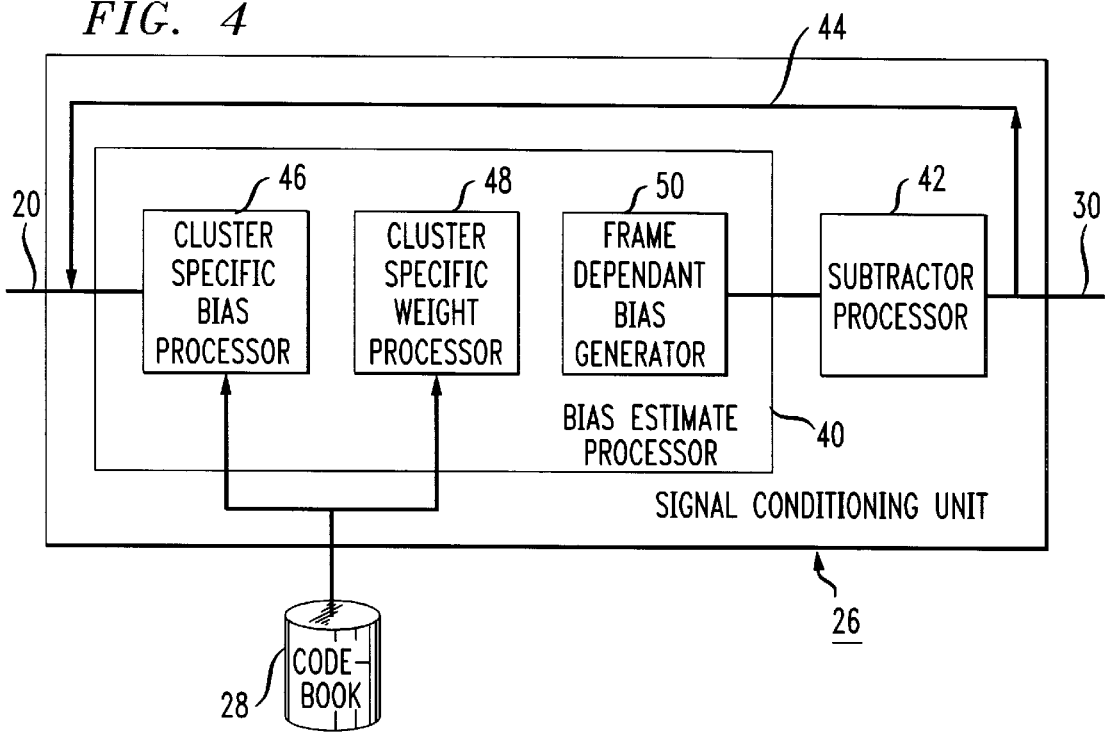

Referring to FIG. 4, the received, or distorted, feature signal 20 comprising cepstral vector sequence $\{Y=y_1, y_2, \ldots y_t, \ldots y_T\}$ is used to estimate the signal bias term, b, according to a maximum likelihood formulation:

$$p(Y|\overline{b}, \Lambda) = \max_{6} \left[ \prod_{+} \max_{i} p(y_t - b|\lambda_i) \right], \quad (6)$$

in which $\lambda_i$ is a Markov model for a speech unit i and $\Lambda = \{\lambda_i, i=1, 2, \ldots, U\}$. The estimated bias term b is used to compensate the channel distortion causing the acoustic mismatch. This is achieved through a two-step iterative process. Referring to FIG. 4:

A bias estimate processor 40 computes an estimate of the signal bias, b, based on the series of frames of feature vectors for each feature signal of T frames, such that $$\overline{b} = (1/T) \sum_{t=1}^{T} (y_t - \mu_i^*), \quad (7)$$

where $\mu_i^*$ is the "nearest neighbor", according to some distance criterion, to the distorted feature signal spectrum $y_i$:

$$i^* = \arg \min_{i} \|y_t, \mu_i\|. \quad (8)$$

The bias estimate processor 40 operates to generate the estimated bias signal, b, to be subtracted from the distorted feature signal $y_i$ to generate a conditioned feature signal $x_i$ of T frames. This can be mathematically represented as follows:

$$x_t = y_t - \overline{b} \quad 1 \leq t \leq T. \quad (9)$$

Referring to FIG. 4, a subtractor processor 42 receives the estimated bias signal, b, from the bias estimate processor 40. The subtractor processor 42 subtracts the estimated bias signal from the feature signal 20 to generate the conditioned feature signal 30. This procedure is iterated (as indicated by feedback line 44) until a local optimal or fixed point solution for estimating the signal bias b is reached.

An assumption made in prior signal bias removal approaches to signal conditioning is that the contaminating bias to be estimated is relatively stationary for (each frame of) each feature signal 20; and, that the bias contaminant does not vary over the period of the speech string signal 16 (FIG. 2). This assumption is not valid when channel conditions are varying, such as in the case of Rayleigh channel fading encountered during mobile cellular telephony and also encountered during usage of a cordless telephone as a speaker moves during a conversation.

Previous signal bias removal approaches use a constant corrective bias estimate over time, for all the frames of the feature signal, to compensate for channel conditions that can cause acoustic mismatch between training and testing. The applicants have recognized that this can be improved.

According to the present invention, multiple time-varying frame-dependent bias estimates are generated to equalize acoustic channel variations between an operational testing speech string signal and stored recognition models. The multiple frame-dependent biases for equalizing acoustic channel variation are applied to discrete frames of feature vectors of a feature signal generated in response to a training string signal or a testing string signal.

To apply multiple time-varying corrective biases to the frames of feature vectors of the feature signal in a one-pass decoding scenario, a "fuzzy" distortion criterion, similar to that used in hierarchical spectral clustering, is incorporated in the fundamental scheme of a hierarchical signal bias removal technique. This scheme will be referred to as hierarchical signal bias removal ("HSBR"), and can be embodied in a sequence of process steps.

Referring to FIG. 4, the bias estimate processor 40 comprises a cluster-specific bias processor 46, a cluster-specific weight processor 48, and a frame-dependant bias generator 50. The cluster-specific bias processor 46 computes a cluster-specific estimate of the bias for each cluster of the codebook 28, such that K biases are generated for a codebook of size K.

In the present invention, the "size" of the codebook means the number of clusters or codewords stored within the codebook, which can be hierarchically increased during processing. In the preferred embodiment of the present invention, there are sixteen clusters ultimately created in the codebook (i.e., K=16).

The $j^{th}$ cluster bias, $b_j$, is generated by the cluster-specific bias processor 46; and, is defined as:

$$b_j = (1/T_j) \sum_{k=1}^{T_j} (y_{tj(k)} - \mu_j), \quad 1 \leq j \leq K, \quad (10)$$

where $y_{tj(k)}$ represent input frames which are nearest to the cluster centroid $\mu_j$, and $T_j$ is the number of frames of feature vectors in the feature signal which are classified to the $j^{th}$ cluster.

For each frame, $y_t$, of the feature signal 20, the frame-dependent bias generator 50 constructs a frame-dependent bias, $\overline{b}_t$, for each frame of the feature signal. Each frame-dependent bias $\overline{b}_t$ is generated responsive to a cluster-specific weight value $\hat{\alpha}_{t(j)}$ generated by the cluster-specific weight processor 48. The frame dependent bias $\overline{b}_t$ is defined as:

$$\overline{b}_t = \sum_{j=1}^{K} b_j \hat{\alpha}_{t(j)}, \quad (11)$$

where $$\hat{\alpha}_{t(j)} = \alpha_{t(j)} / \sum_{i=1}^{k} \alpha_{t(i)}. \quad (12)$$

The cluster-specific weight processor computes a cluster-specific weighting value, $\alpha_{t(j)}$, between the input feature signal $y_t$ and the cluster centroid, which is defined as $$\alpha_{t(j)} = [(y_t - \mu_j)^a]^{-1}, \quad (13)$$

where a is set to 2 as a Euclidean distance.

The frame-dependent bias generator generates the frame-dependent bias, $\overline{b}_t$. The input feature signal $y_t$ is signal-conditioned by the subtractor processor 42 to generate a conditioned feature signal, $x_t$, (30 FIGS. 2 and 4) as depicted by the following equation:

$\bar{x}_t = y_t - \bar{b}_t.$ (14)

The above-described process steps can be iterated (as shown by line 44) to refine the multiple frame-dependent bias estimates. In an iteration, the conditioned feature signal 30 is passed back to be input to the bias estimate processor 40. In practice, however, a single iteration is often sufficient to achieve bias estimate convergence for optimal signal bias removal.

Hierarchical signal bias removal (HSBR) utilizes a reference codebook $\{\mu_i\}$ comprising one or more nodal clusters. The codebook 28 provides a condensed characterization of the acoustic space best corresponding to a matched acoustic condition between training or testing string signals and recognition models in the speech recognition system. The codebook 28 is constructed in training or testing by vector quantization ("VQ") clustering similar acoustic feature vectors in the set of recognition HMM parameter distributions. In a specific embodiment of the HMM-based speech recognition system, the reference codebook 28 is constructed by clustering the HMM means (vectors) of the stored Gaussian distributions.

The clustering process creates a relatively small number of mean vector clusters (as compared to the entire set of HMM parameter Gaussian distributions) in the codebook 28. As a result, the codebook (of a specified size) can be generated on-line during training or testing. The codebook 28 is created and updated as a function of the recognition HMM parameters 34 (FIG. 2).

It is possible (though not preferable) to generate the codebook from a succession of training string signals during creation of recognition models in the recognition database during a training session, rather than from the set of recognition models created. However, if the size of the succession of training data is large, a codebook created directly from the succession of training string signals can be more difficult to construct than a codebook obtained from a set of recognition models. It is preferred that the codebook be created from the mean vectors of the set of HMM parameter distributions stored as recognition models.

An appropriate size codebook can be preselected. Selection of a codebook size can effect signal conditioning performance. The codebook size is determined using a hierarchical clustering approach. In HSBR, signal conditioning is applied hierarchically to methodically create and apply different codebook sizes to compensate for acoustic and channel variations using multiple frame-specific bias estimates.

The HSBR signal conditioning process is initiated with a codebook of size 1. That is, the codebook has a single codeword (cluster). After each cycle of signal conditioning, the codebook is split (i.e., its size is doubled). After the codebook size is doubled, "fuzzy" signal bias removal conditioning is applied to each frame of the feature signal to modify one or more frames of the feature signal, which shifts the frames acoustically closer to the acoustic space of the set of recognition models. The modified frames of feature vectors more closely acoustically match the acoustic space of the recognition models developed during training to decrease the likelihood that the recognition models will be deceived. The equalized (or "conditioned") feature vector sequence embodied as the conditioned feature signal is the input for the next step of hierarchical signal conditioning.

In the next process step, the codebook size is doubled (hence the name "hierarchical"). The process is repeated until a specified maximum size value, $K_{max}$, of the codebook (number of clusters) is reached; or, until a desirable minimal estimated bias is achieved. In the preferred embodiment of the present invention, the maximum codebook size, $K_{max}$ is set to 16.

Figure 5:
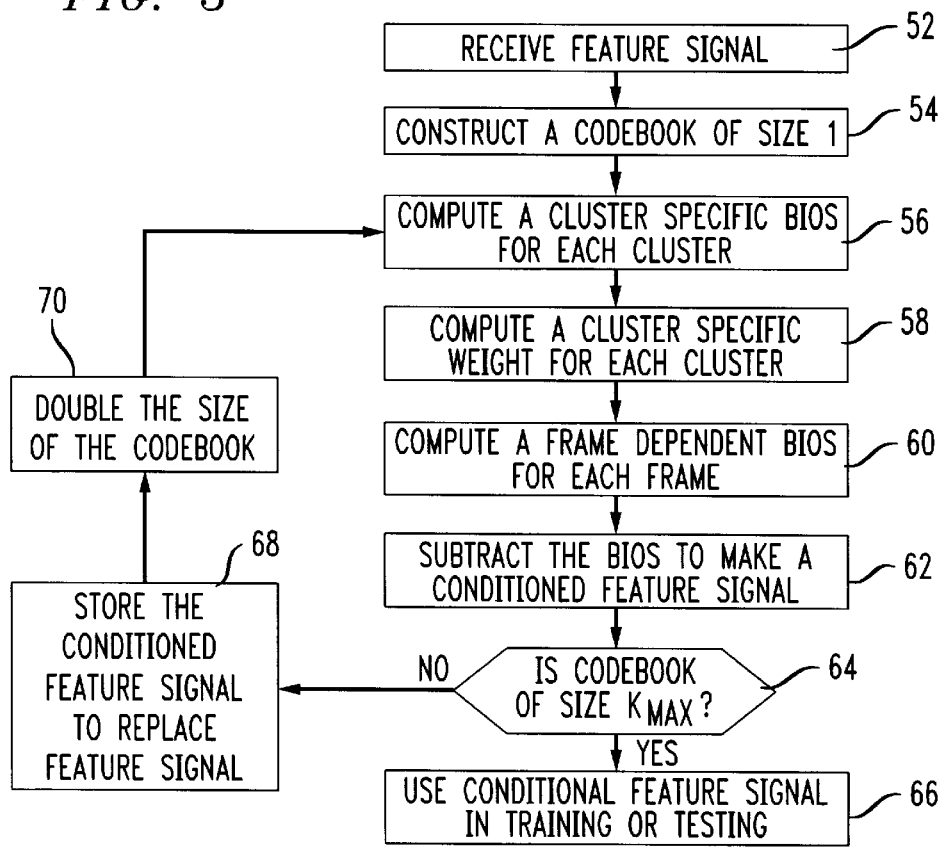

Operation of HSBR signal conditioning is depicted in FIG. 5. A feature signal to be conditioned is received by the signal conditioning unit 52. A codebook is initially constructed from the set of recognition models. The codebook is initialized to store one cluster 54. A cluster-specific bias is computed for each cluster of the codebook (initially having only a single cluster) 56. A cluster specific weight is computed for each cluster 58. Based on the cluster-specific bias for each cluster and on the cluster-specific weight for each cluster, a frame-dependent bias for each frame of the feature signal is generated 60. The frame-dependent bias generated for each frame of the feature signal is subtracted from each frame of the feature signal to generate a conditioned feature signal 62. The signal conditioning unit queries if the codebook is of size $K_{max}$ yet 64.

If yes, the conditioned feature signal is passed to the recognition processor for training or testing operations 66.

If no, the conditioned feature signal is stored in memory to replace the feature signal 68. The codebook size is doubled 70 and the stored conditioned feature signal is used as a distorted feature signal as the HSBR signal conditioning process taught by the present invention is repeated.

Training string signal data used to make speech recognition models are typically collected through different channels (i.e., telephone lines) and communication media (i.e., microphones). The term "matched" channel condition might apply to a telephonic switching network, while not accurately representing the acoustic nature of the testing or training string signals as compared to the stored recognition models.

Training string signals from multiple acoustic environments tend to exacerbate acoustic variation and acoustic mismatch (for example, based on different microphones used by different speakers) within the stored recognition models. Thus, the constructed recognition HMM model database often consists of sets of HMM parameter distributions that are known to incorporate acoustic and channel variations.

Background noise inherent in the telephonic channel is often a large component of a speech string signal received by a speech recognition system. Differing signal conditions can degrade speech recognition performance and can decrease the robustness of the speech recognition system.

Enlarging the size of the recognition database to store more recognition models and increasing the complexity of the recognition models are possible means for accommodating diversified acoustic and channel conditions. Increasing complexity, however, incurs extra costs in terms of decoding speed and memory usage and does not account for new signal conditions encountered in operational recognition testing.

According to an illustrative embodiment of the present invention, hierarchical signal bias removal is applied in conjunction with string-based minimum string classification error training. The present invention improves minimum string classification error training by combining HSBR signal conditioning and minimum string classification error training into an interrelated process.

The HSBR codebook used for signal conditioning the training or unknown speech string signals is constructed from the mean vectors of the set of recognition HMM parameters stored in the recognition database. Each training string signal receives hierarchical signal bias removal (HSBR) prior to being used in string model based minimum classification error training.

The HSBR codebook takes into account recognition HMM parameter adjustments during training. The stored recognition HMM parameters are updated to model the basic speech recognition units based on the acoustic space represented by the signal-conditioned training string data. The HSBR codebook is updated based on the means of the recognition HMM parameters, which are modified during training.

Because the HSBR codebook used for signal conditioning is generated and updated while the recognition models are being adjusted and modified, the speech recognition system does not require the complexity to look back into the training string signals received in order to generate an updated HSBR codebook suitable for a new acoustic environment. The preferred embodiment can adapt to a new environment easily even if training data from that environment are sparse.

Minimum classification error training is effective in reducing the error rate under adverse speech recognition conditions. However, the error rate and the recognition performance are conditioned unavoidably upon, and effected in operation by, acoustic and channel variations.

Signal conditioning reduces acoustic and channel variations by shifting training or testing string signals acoustically closer to the acoustic space of the recognition models. Integrating signal conditioning with recognition model training in accordance with the present invention makes the acoustic space of speech string signals and the acoustic space of the recognition models more homogeneous, less sensitive to ambient conditions, and more robust. Recognition models based on signal-conditioned training data can be created using a relatively small number of Gaussian mixtures.

Figure 6:
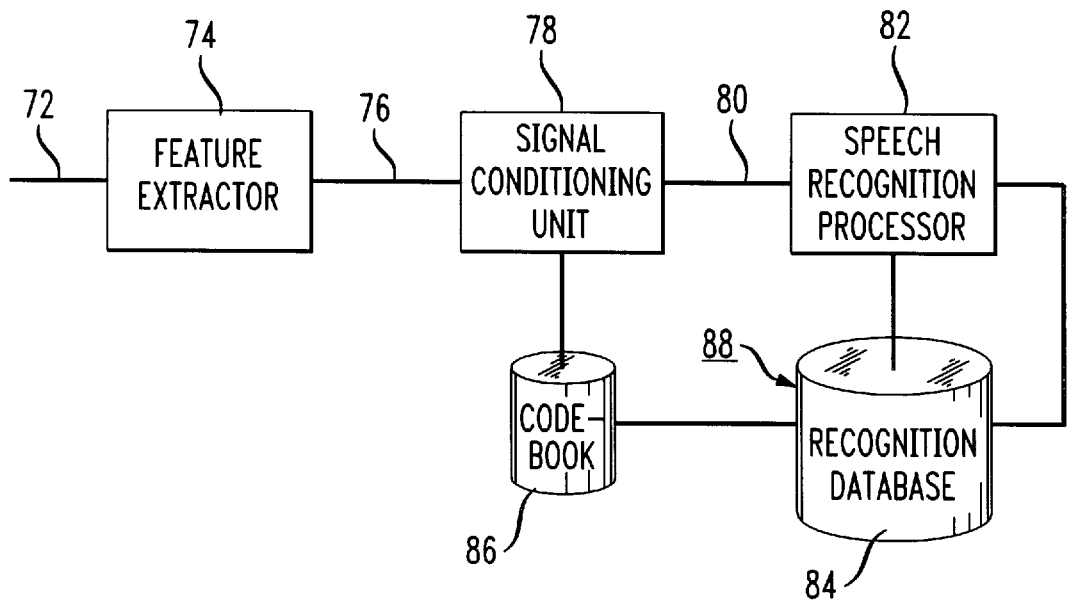

Referring to FIG. 6, a training speech string signal 72 is presented to a feature extractor 74. Cepstral features are extracted by the feature extractor 74. The feature extractor generates a feature signal 76 based on the training string signal 72. The feature signal 76 is input to a signal conditioning unit 78. The signal conditioning unit 78 conditions the feature signal 76 to generate a conditioned feature signal 80, which is input to a speech recognition processor 82.

The HSBR signal conditioning unit 78 modifies the extracted cepstral features of the feature signal 76 and generates modified speech features which are less likely to deceive the recognition models 84. The HSBR signal conditioning unit 78 removes acoustic "contaminants" from the feature signal 76. The generated conditioned feature signal 80 embodies uncontaminated extracted cepstral features.

A closed-loop feedback system accomplishes signal conditioning as part of minimum classification error training. The closed-loop system shown in FIG. 6 determines a current set of recognition models 84, determines the cepstral features of the feature signal 76, shifts the cepstral features based on the current set of recognition models 84, and makes a new set of recognition models. Recognition model training is performed iteratively and repetitively in the closed-loop system.

The codebook 86 approximates the current recognition models 84. The signal conditioning unit 78 shifts or modifies the cepstral features of the feature signal 76 based on the codebook 86. The conditioned feature signal 80 is then used to create new recognition models.

The signal conditioning unit 78 examines the recognition models 84 through the condensed codebook 86, examines the feature signal 76, and shifts the cepstral parameters 84 of the feature signal acoustically "closer" to the recognition HMM parameters stored in the recognition database 88.

Similar HMM distributions are clustered at nodes of the codebook 86. The signal conditioning unit 78 superimposes the frames of feature vectors into the acoustic space of the recognition HMM parameters by shifting and modifying the features based on the codebook 86.

During MSCE training, the recognition models are iteratively adjusted and improved to minimize the likelihood of classification error. Using signal conditioning in MSCE training provides benefits in addition to those provided by the discriminative MSCE training process alone.

MSCE training makes recognition models based on cepstral features extracted from the training string signals. Signal conditioning is employed after feature extraction, prior to making recognition models, in the repetitive closed-loop process depicted by FIG. 6.

Figure 7:
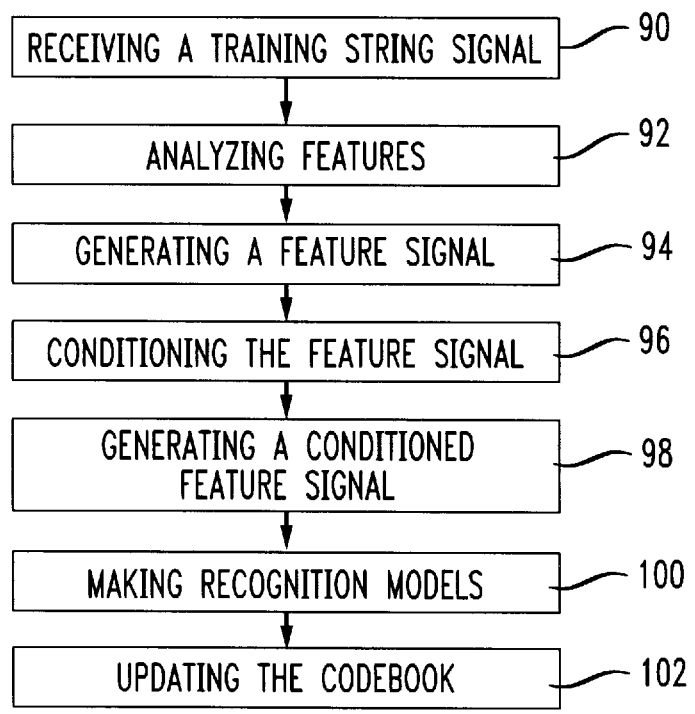

Signal conditioned recognition model training is further described with reference to FIG. 7. The speech recognition system receives a known training speech string signal 90. The training string signal is presented to the feature extractor. The feature extractor analyzes the training string signal 92 to generate a feature signal comprising one or more frames of feature vectors 94. The feature signal is provided as input to the signal conditioning unit. The signal conditioning unit conditions the feature signal 96 to produce a conditioned feature signal 98. The conditioned feature signal is used to create and modify recognition models 100. The modified recognition models are used to update the codebook 102.

The speech recognition system receives a subsequent training string signal. The feature extractor analyzes the subsequent training string signal in the cepstral domain and generates a feature signal representative of the subsequent training string signal. The signal conditioning unit conditions the feature signal using the updated codebook approximation and generates a conditioned feature signal which is shifted closer to the acoustic space of the current recognition models.

The conditioned feature signal is used for training a new set of recognition HMM parameters. The codebook is updated based on the new set of recognition HMM parameters and used for conditioning subsequent training string signals as the training process is iteratively repeated.

Signal conditioning the feature signal removes acoustic artifacts from the frames of feature vectors in the generated conditioned feature signal. The recognition models are trained on conditioned feature signals without contaminating acoustic artifacts.

As the closed-loop training system is iteratively operated, the conditioned feature signal contains fewer and fewer artifacts. Because the signal-conditioned feature signal contains fewer artifacts, the recognition models being created better represent the succession of training string signals so that a more accurate codebook can be created.

The more accurate codebook improves the signal conditioning process applied by the signal conditioning unit. The improved signal conditioning process generates a conditioned feature signal that contains still fewer contaminating artifacts for making better recognition models, which are even more representative of the set of training string signals.

Training is culminated when the expected recognition error is recursively minimized to an acceptable level or based on some other preselected criterion. The trained recognition models are enhanced and are less susceptible to deception caused by acoustic channel variations. HSBR signal conditioning complements the advantages provided by MSCE discriminative training to decrease the likelihood of recognition error.

In testing, the speech recognition system is operated to recognize an unknown speech string signal. As an initialization step, a codebook is constructed from the set of recognition models stored in the recognition database. An unknown speech string to be recognized is input to the speech recognition system. The feature extractor analyzes the unknown speech string signal and extracts cepstral features from the speech string signal. The feature extractor generates a feature signal comprising a series of frames of feature vectors in the cepstral domain. The signal conditioning unit conditions the feature signal using the codebook, and generates a conditioned feature signal. The conditioned feature signal is passed to the speech recognition processor. The speech recognition processor scores the conditioned feature signal against the set of recognition models stored in the recognition database and operates to generate a recognized text signal.

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

In light of the above, it will be apparent to one of ordinary skill in the art that the present invention is applicable to both speaker-dependent and speaker-independent speech recognition. In addition to applicability to speech recognition systems, the present invention has applicability to speaker recognition systems, such as speaker verification or speaker identification.

The present invention is applicable to HMM-based recognition processors and also to other recognition processors, such as, e.g., a template-based recognition processor employing dynamic time warping as the method of scoring. It will be further apparent that although discussed in the context of speech recognition, the techniques used to train recognition models are applicable to pattern recognition generally.

From the foregoing, it will be appreciated that using hierarchical signal bias removal signal conditioning enhances minimum string classification error training to further decrease the likelihood of misrecognition error. Acoustic utterance recognition modeling based on signal-conditioned training data improves recognition model resolution and speech recognition performance.

It is to be understood that the above-described embodiments are merely illustrative, and that many variations can be devised by those skilled in the art without departing from the scope of the invention as defined by the following claims.

What is claimed is:

1. A method of signal conditioning for removing an unknown signal bias in a speech signal in a speech recognition system storing a set of recognition models, comprising the following steps:
   (A) generating a feature signal which characterizes features of the speech signal, the feature signal comprising one or more frames of feature vectors;
   (B) storing the feature signal in memory;
   (C) constructing a codebook comprising one or more clusters based on the set of recognition models;
   (D) calculating a cluster-specific bias for each of the clusters of the codebook;
   (E) calculating a cluster-specific weight for each of the clusters of the codebook;
   (F) generating a frame-dependent weighted bias signal for each frame of the feature signal;
   (G) subtracting the frame-dependent weighted bias signal for each frame of the feature signal from each frame of the feature signal to generate a conditioned feature signal; and
   (H) storing the conditioned feature signal in memory to replace the feature signal.

2. A method according to claim 1, wherein step (A) comprises the steps:
   receiving the speech signal; and
   extracting features from the speech signal to generate the feature signal.

3. A method according to claim 1, further comprising the step:
   (I) doubling the number of clusters within the codebook.

4. A method according to claim 3, further comprising the step:
   repeating steps (A) through (I) a preselected number of times.

5.. A method according to claim 4, further comprising the step:
   determining whether the number of clusters is equal to a preselected number.

6. A method according to claim 1, further comprising the step:
   using the conditioned feature signal to modify the set of recognition models.

7. A method according to claim 1, wherein:
   the codebook is a condensed representation of the set of recognition models.

* * * * *